June 4, 1929.  E. J. PELL  1,715,946
FLUID METER
Filed April 19, 1926   2 Sheets-Sheet 1
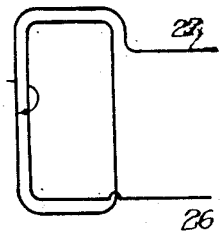
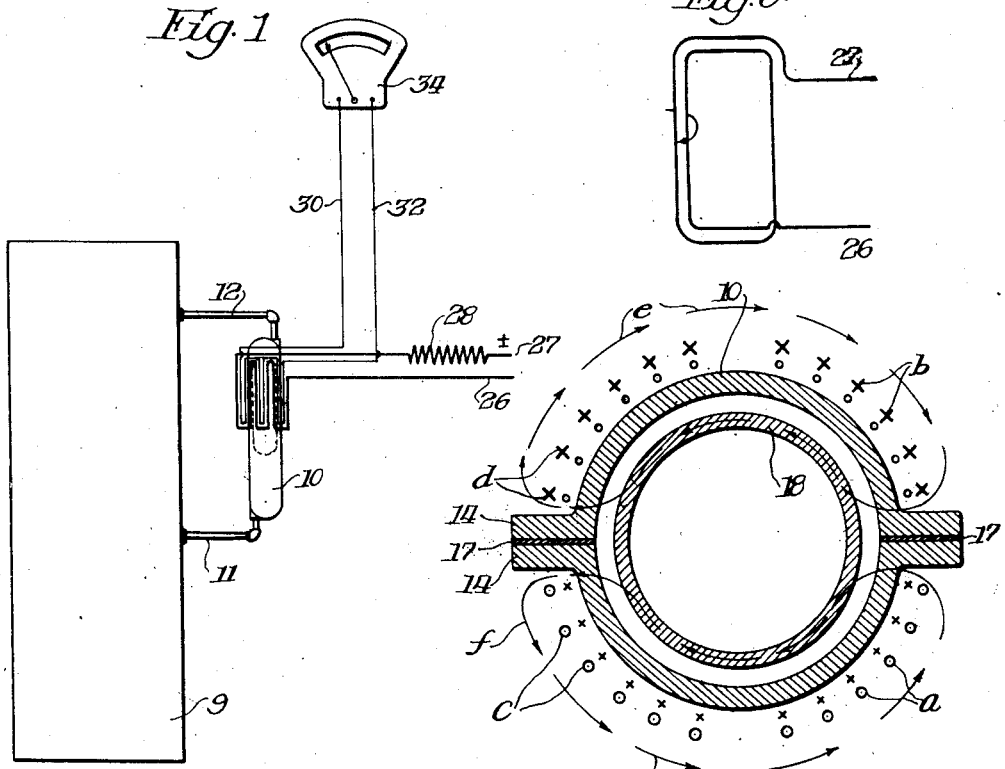
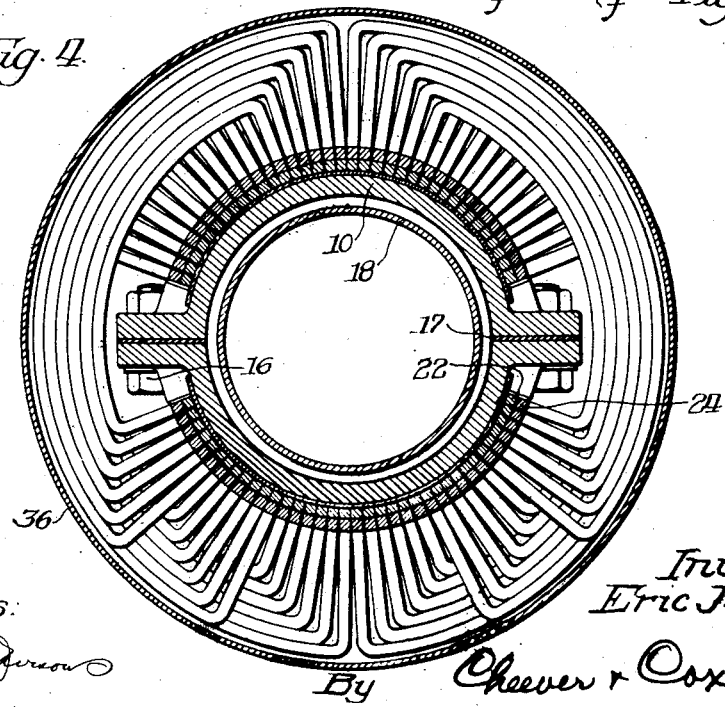
Inventor:
Eric J. Pell.
By Cheever & Cox Attys
Witness:

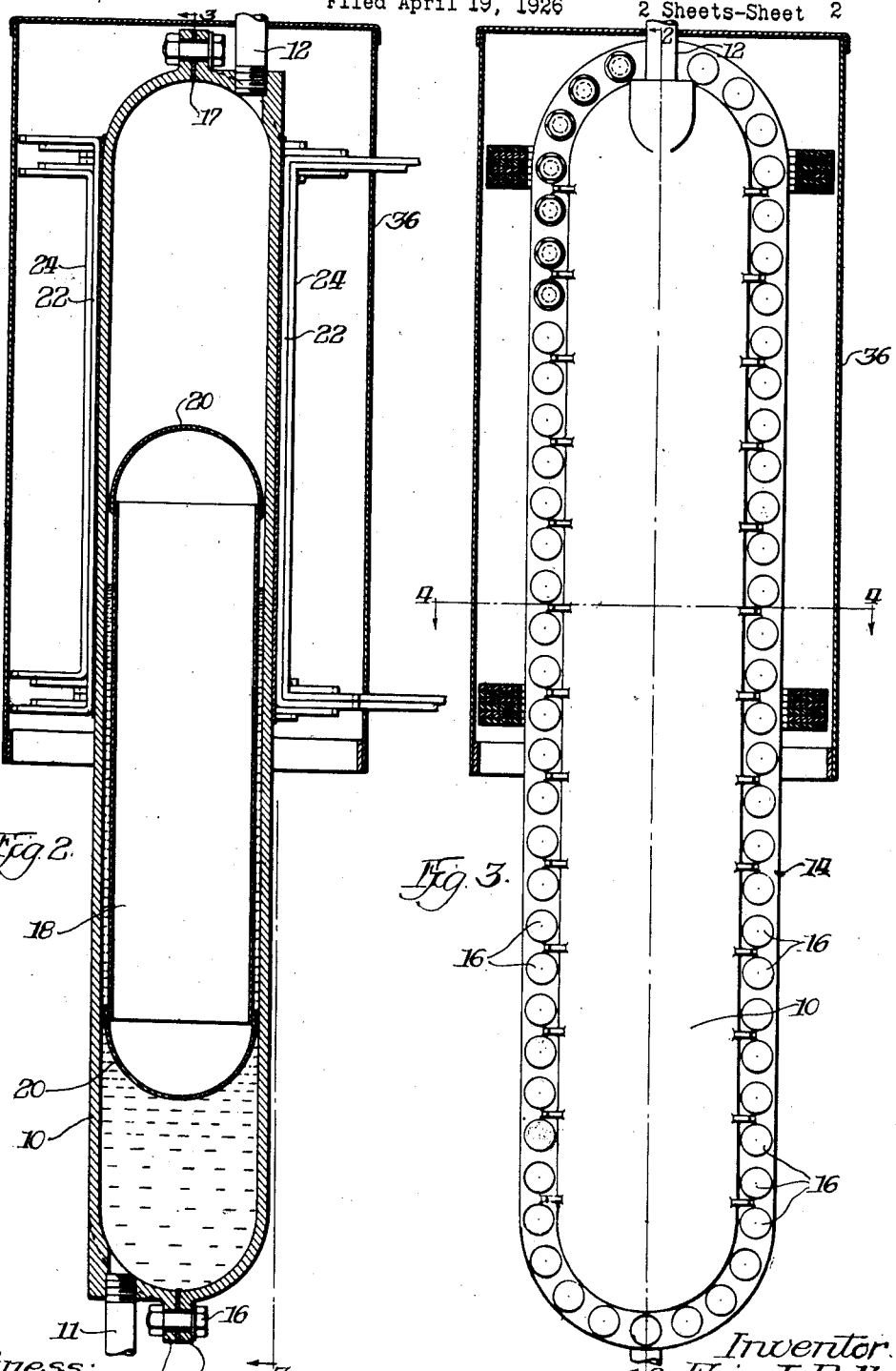

Patented June 4, 1929.

1,715,946

UNITED STATES PATENT OFFICE.

ERIC J. PELL, OF CHICAGO, ILLINOIS.

FLUID METER.

Application filed April 19, 1926. Serial No. 103,076.

My invention relates in general to apparatus for indicating at a distance, the fluctuation in the level of water or other liquid contained in a boiler or similar reservoir, and has more particular reference to a device embodying the principle that the electric energy induced in the secondary winding of a transformer varies directly with the magnetic permeability of its field.

The device of my invention comprises a transformer, the primary winding of which is arranged to set up a magnetic field, within which moves a permeable core in the form of a float, the position of which, with respect to the magnetic field of the transformer is determed by the altitude of the level of the liquid in the reservoir. The energy induced in the secondary circuit is a function of the position of the float with respect to the field, and so the liquid level may be measured by determining the induced energy by means of a suitable instrument.

In devices of this character, it is highly desirable to provide a straight line ratio between the fluid level and the corresponding instrument reading in order that the scale on the instrument may be uniformly graduated to indicate unit increments in the altitude of the liquid level. In the device of my invention, I have accomplished this result by arranging the coils of the primary and secondary transformer windings in a novel manner which I will hereinafter describe.

The principal object of the invention is to provide an electrical gage operating on principles of magnetic induction and having a straight line characteristic, that is to say, having a constant ratio between the liquid level altitude and the registered deflection of the meter.

Another important object of the invention is to provide an electromagnetic liquid level gage of simple and rugged construction, the parts of which are formed to simplify assembly and hence to reduce the cost of manufacturing the device.

Another important object of the invention is to provide a device arranged to operate upon a minimum amount of power and which at the same time has uniform and reliable operating characteristics.

Still another object of the invention is to provide a novel method of arranging the coils of the transformer in order to provide ease of assembly and also to insure the provision of a uniform magnetic field throughout the path of travel of the float.

Other objects and advantages will be apparent as the invention is more fully understood from the following description, which taken in connection with the accompanying drawings discloses a preferred embodiment of the device.

Referring to the drawings:

Figure 1 is a diagrammatic view illustrating the present invention as applied to a boiler or other tank.

Figure 2 is a central vertical section taken along line 2—2 of Figure 3 through the float and float chamber.

Figure 3 is a similar view taken on the line 3—3 of Figure 2, the float chamber being shown in elevation on the coil housing and the coils being in section.

Figure 4 is a horizontal section taken on the line 4—4 of Figure 3, showing the coils and their arrangement with respect to the float chamber.

Figure 5 is a view similar to Figure 4 illustrating diagrammatically the position of the coils, the current flow and the lines of magnetic flux.

Figure 6 is a diagrammatic view for illustrating the manner in which the coils are assembled against the side of the float chamber.

Like numerals denote like parts throughout the several views.

To illustrate the invention I have shown a float chamber 10 which communicates with the boiler 9 or other container whose liquid level is to be indicated. The connections are by means of a duct 11 which communicates with the bottom of the float chamber and with the boiler at a point below the minimum water level. A duct 12 leads from the top of the float chamber to the boiler at a point above the maximum water level therein. Primary and secondary transformer windings, identified by numerals 24 and 22 respectively, are arranged about the upper portions of the float chamber 10 which is in the main cylindrical and is constructed of non-magnetic material. According to the particular design shown the float chamber is formed in two halves provided with flanges 14 secured together by bolts, some of which are marked 16. These halves are electrically insulated from each other by a gasket 17 of asbestos or other insulating material in order to prevent the setting up of circulating eddy currents induced within the walls of the float chamber whenever the transformer is excited and which materially reduce the efficiency of the transformer.

The transformer windings comprise a plurality of coils arranged substantially as shown in Figure 6, each coil has substantially straight portions adapted for external arrangement adjacent the sides of the cylindrical float chamber, and a curved end connecting portion for interconnecting the upper ends of the straight portions of the coil. The coils are adapted to be separately assembled upon the float chamber, the straight portions being arranged adjacent the float chamber walls and parallel to the axis of the chamber and the curved portions being spaced from the chamber walls when the coils are in assembled position. The straight portions of the coils comprise the effective or field inducing portion of the transformer winding and are arranged adjacently about the float chamber and form a cylindrical jacket enclosing the float chamber. Each coil of the transformer winding is identical with every other coil and as they have a U-shaped appearance when viewed in horizontal cross section, they may be applied or removed from the float chamber by moving them radially inwardly or outwardly therefrom. The secondary coil 22 is preferably assembled immediately adjacent to, though insulated from, the float chamber 10 while the primary coils 24 are laid over the secondary coils as indicated in Figure 4. It will be understood that the various conductors of the primary and secondary coils are insulated from each other. After being arranged in position, consecutive primary coils are connected in series to form the primary winding of the transformer and the consecutive secondary coils are similarly connected, the connections between consecutive coils being made by means of curved end connectors, similar to those connecting the upper ends of the cooperating straight portions of each coil, which are brazed soldered or similarly fastened between the lower ends of the straight portions of adjacent coils. The primary winding is connected by wires 27 and 26, through a high resistance unit 28 to a suitable source of fluctuating electrical energy which is preferably alternating current such as is usually supplied in the ordinary house lighting circuit but which also may be a pulsating direct current. The resistance unit 28 is necessary for the purpose of cutting down the consumption of electrical energy, the device being adapted to operate on closed circuit. The secondary winding of the transformer is connected by means of wires 30 and 32 to a volt meter 34 or other suitable indicating or recording instrument adapted to measure the energy induced in the secondary winding.

Within the float chamber is a float 18, which is made of soft steel or other material which has a high coefficient of magnetic permeability. In order that it may be buoyant it is hollow and consists preferably of sheet metal arranged in cylindrical form and closed top and bottom by means of semi-spherical caps 20. In order not to distort the characteristic of the induced current it is preferable that said caps 20 be of non-magnetic material. It is desirable also that the float be only slightly less in diameter than the internal diameter of the float chamber in order that it may be held in upright position and at the same time be freely movable in a vertical direction in accordance with the level of the liquid within the float chamber.

In order to protect the transformer coils and to impart a finished appearance to the device it is desirable to house the coils in a casing 36.

In operation, the level of the liquid in the float chamber varies, of course, in accordance with the level of the liquid in the boiler or other container under observation. When the supply conductors 26, 27 are connected to a source of alternating or fluctuating current, a corresponding current is induced in the secondary coils and the voltage of this induced current is indicated by the instrument 34. As is well known, the efficiency of a transformer may be varied by increasing or decreasing the magnetic reluctance of the field set up by the fluctuations in the primary coil. Air has a greater reluctance than iron or steel, and as the float in my apparatus is of a material highly permeable to magnetic flux, it follows that the efficiency of the transformer in my device will be increased in proportion to the extent to which the induced magnetism will be afforded an opportunity to travel through the metal of the float instead of through the air. With the coils arranged in the manner illustrated the magnetic force lines will be formed in horizontal planes and around the conductors, and consequently the higher the float stands in the float chamber the more of these magnetic lines of force will be provided with a magnetic path having low reluctance, i. e., a path through the float instead of through the air within the float chamber. Consequently the higher the float stands in the float chamber the greater will be the efficiency of the transformer and the greater will be the amount of energy induced in the secondary circuit and indicated on meter 34.

The magnetic field set up by the primary of the transformer within that portion of the float chamber enclosed by the transformer windings is uniform in each plane taken perpendicularly through the float chamber, and the float is a magnetic cylinder, so that the efficiency of the transformer will be increased proportionally as the float moves into the induced field. Since the increase in transformer efficiency results in a proportional increase in the induced secondary voltage, which in turn is measured by the deflection of the meter 34, and since the increase in efficiency is proportional to the height of the float within that portion of the float chamber enclosed by the transformer windings, it will be apparent that a deflection of the instrument 34 will be directly proportional to the height of the float within the chamber, that is to say, to the height of the liquid in the reservoir. In other words, by arranging the transformer coils in the novel manner shown in order to provide a field having a uniform strength throughout the path of motion of the float, I have provided an electrical measuring apparatus having a straight line characteristic.

Figure 5 is a diagrammatic illustration of the windings to show the magnetic force set up within the float and float chamber when the apparatus is in operation. Let it be assumed that the large circles $a$ represent those conductors in one of the primary coils in which the current is flowing upward, and the large crosses $b$ those in which it is flowing downward. Let it also be assumed that the large circles $c$ represent those conductors in the other primary coil in which the current is traveling upward and the large crosses $d$ are those conductors of the same primary coil in which the current is flowing downward. According to my understanding of the generally accepted theory of electricity, at least as used for explanatory purposes, under certain circumstances the conductors in which the current is traveling downward set up a magnetic field in which the lines of force travel in the path indicated by the arrows $e$ in the upper portion of Fig. 5 and the conductors in which the current is traveling upward set up a magnetic field in which the lines of force travel in the path indicated by the arrows $f$ in the lower portions of Fig. 5. It will be evident that if the lines of force in a given plane have the float 18 to travel through on a portion of the path, the reluctance will be decreased and hence the efficiency of the transformer action will be increased, and the instrument 34 will indicate the fact. It will also be evident that by reason of the arrangement of the coils with the main or straight portion of their turns disposed parallel to the line of movement of the core or float 18, the magnetic lines of flux will be uniformly distributed in planes perpendicular to the path of movement of the float or core. This construction produces a constant and uniform reading on the indicator which is not true in constructions wherein the main turns of the coils would lie perpendicular to the line of movement of the float or core and in which latter construction the lines of force of the magnetic field run parallel to the line of movement of the core. For in this latter construction there are more lines of force at the center of the coil that is to say, the field is congested and hence as the core moves into the center of the coil it will cut more lines of force per unit of distance moved than it will near the ends. In my improved arrangement the field is uniform all the way because the core moves substantially at right angles to the lines of force and they are distributed uniformly so that the resulting indication on the meter 34 is a straight line function of the level of the float. By suitably calibrating the instrument the position of the float and thus the height of the water level in the boiler may be gauged.

From the foregoing it will be seen that this device forms a simple and reliable means for indicating the level of the liquid under observation. By arranging the coils in the novel manner indicated the magnetic lines will employ both sides of the float as a path through which to travel and the field set up by the primary coil is uniform at all points along the path of the float. The device moreover can be easily assembled for the float chamber is formed in two parts which are simply bolted together and as the coils are semi-cylindrical when viewed in horizontal cross section they may be applied or removed by simply moving them laterally toward or from the sides of the float chamber. Except for the measuring instrument 34 and the float, there are no moving parts. The float may be of rugged construction and hence capable of operating for a long period without becoming out of order. It will be noted that no movable coils are present in the arrangement disclosed and that the transformer coils are arranged up on the float chamber with the end connecting portions spaced at a distance from the walls of the float chamber so that the uniform field induced within the float chamber by the straight or effective field inducing portions of the coils is not distorted by the magnetic effect of the end connections.

Having thus described my invention what I claim as new and desire to secure by Letters Patent is:

1. A liquid gage comprising, a transformer having a primary and secondary winding and a magnetically permeable core, means whereby the core may be shifted within the magnetic field of said primary winding in accordance with the movement of a fluid level, said primary winding being arranged to induce a magnetic field between limits within the path of movement of said core, of such character that the float has a straight line permeability curve when moved in the field of the transformer between said limits, means for exciting the primary winding and means for measuring the energy induced in the secondary winding.

2. In a liquid level gage of the induction type having a magnetically permeable movable float, a transformer having primary and secondary windings comprising coils having substantially straight field producing portions arranged parallel and adjacent the path of said float and end connecting portions spaced appreciably away from the float, said windings being arranged about the path of said float whereby the float has a straight line permeability curve.

3. A liquid level gage of the induction type comprising a float chamber divided axially in symmetrical parts, each part being electrically insulated from the adjacent part, a float formed of magnetically permeable material enclosed within said chamber and adapted to be raised and lowered within the chamber in accordance with the liquid level to be gaged, a primary and secondary transformer winding arranged about the upper portions of said float chamber, said windings comprising coils having straight field producing portions arranged adjacent the walls of and parallel to the axis of said chamber, and connecting portions extending between the ends of said straight portions and spaced from the walls of said float chamber, said primary transformer windings being connected to a source of periodically fluctuating electrical energy, and said secondary winding being connected with an indicating instrument.

4. A liquid level gage of the induction type comprising a float chamber divided longitudinally into a plurality of segments, each said segment being insulated electrically from the adjacent segments, a magnetically permeable float movable axially within said chamber in accordance with a liquid level to be gaged and transformed windings arranged about portions of said chamber, the primary coils of said transformer winding being connected to a source of fluctuating electrical energy and the secondary windings thereof being connected with an indicating instrument.

5. A liquid level gage of the induction type comprising a substantially cylindrical float chamber divided longitudinally into a plurality of segments, each segment being electrically insulated from an adjoining segment, a magnetically permeable float arranged within said float chamber and movable longitudinally therein in response to the movements of a fluid level to be gauged and transformer windings arranged about a portion of said float chamber, said windings comprising coils having substantially straight portions arranged adjacent the walls of said float chamber and parallel with the axis thereof and end connecting portions spaced away from chamber walls periodically fluctuating, means for exciting the primary winding of said transformer and means for measuring the energy induced in the secondary winding thereof.

6. In a liquid level gauge of the induction type, a float chamber, a primary and secondary transformer winding arranged about the walls of said float chamber, means for exciting said primary winding, means for measuring the induced energy in said secondary winding, and a magnetically permeable float arranged to move within the float chamber in response to the movement of a liquid level therein, the primary winding being arranged to induce a magnetic field within the float chamber and in the path of the float of such character that the float has a straight line curve of permeability when moved into the magnetic field of the transformer.

7. A liquid level gauge of the induction type comprising a float chamber divided longitudinally into a plurality of segments, each said segment being insulated electrically from an adjoining segment, an outwardly extending flange formed to each segment whereby adjacent segments may be secured together, a magnetically permeable float movable axially within the float chamber in response to the movement of a liquid level to be gauged, and transformer windings arranged about the float chamber, said windings having relatively straight portions arranged closely to the walls of the float chamber and extending parallel with the axis thereof and curved connector portions spaced from the walls of the float chamber sufficiently to pass over a flange whereby to interconnect the ends of straight portions lying on opposite sides of the flange.

In witness whereof, I have hereunto subscribed my name.

ERIC J. PELL.